(12) United States Patent
Song et al.

(10) Patent No.: US 11,870,073 B2
(45) Date of Patent: Jan. 9, 2024

(54) CATHODE MATERIALS FOR LITHIUM OXYGEN BATTERIES

(71) Applicants: WASHINGTON STATE UNIVERSITY, Pullman, WA (US); Hyundai Motor Company, Seoul (KR); Kia Corporation, Seoul (KR)

(72) Inventors: Min-Kyu Song, Pullman, WA (US); Xiahui Zhang, Pullman, WA (US); Wonkeun Kim, Uiwang-si (KR); Ji-hoon Jang, Uiwang-si (KR)

(73) Assignees: Washington State University, Pullman, WA (US); Hyundai Motor Company, Seoul (KR); Kia Corporation, Seoul (KR)

( * ) Notice: Subject to any disclaimer, the term of this patent is extended or adjusted under 35 U.S.C. 154(b) by 563 days.

(21) Appl. No.: 17/056,022

(22) PCT Filed: May 17, 2019

(86) PCT No.: PCT/US2019/032901
§ 371 (c)(1),
(2) Date: Nov. 17, 2020

(87) PCT Pub. No.: WO2019/222649
PCT Pub. Date: Nov. 21, 2019

(65) Prior Publication Data
US 2021/0218024 A1    Jul. 15, 2021

Related U.S. Application Data

(60) Provisional application No. 62/672,826, filed on May 17, 2018.

(51) Int. Cl.
*H01M 4/583* (2010.01)
*H01M 10/0525* (2010.01)
(Continued)

(52) U.S. Cl.
CPC .......... *H01M 4/583* (2013.01); *H01M 4/366* (2013.01); *H01M 4/60* (2013.01);
(Continued)

(58) Field of Classification Search
CPC ........ B82Y 30/00; B82Y 40/00; H01G 11/06; H01G 11/26; H01G 11/36; H01G 11/46;
(Continued)

(56) References Cited

U.S. PATENT DOCUMENTS

| | | | |
|---|---|---|---|
| 2016/0351973 A1 | 12/2016 | Albano et al. | |
| 2017/0073364 A1 | 3/2017 | Dinca et al. | |
| 2017/0222217 A1* | 8/2017 | Wang | H01M 4/133 |

FOREIGN PATENT DOCUMENTS

| | | |
|---|---|---|
| CN | 103956502 B | 3/2016 |
| KR | 10-1051402 B1 | 7/2011 |

OTHER PUBLICATIONS

Zhang et al., Nanocrystalline Metal-Organic Frameworks/Carbon Nanotubes Composites As Catalytic Cathode Materials for Lithium-Oxygen Batteries with Long Cycle Life, ECS Meeting Abstracts, May 22, 2018, Web.

* cited by examiner

*Primary Examiner* — Lingwen R Zeng
(74) *Attorney, Agent, or Firm* — Morgan, Lewis & Bockius LLP

(57) ABSTRACT

The embodiments herein provide for an oxygen/air cathode that includes metal-organic frameworks and/or hybrids of metal-organic frameworks and carbon networks. The metal-organic-framework-based Li—$O_2$ cells are operated in humid $O_2$ where water plays a critical role in improving battery performance. Such embodiments not only improve battery performance but also reduces the cost by cycling the Li—$O_2$ batteries in humid oxygen with MOF@CNT hybrid catalysts.

10 Claims, 20 Drawing Sheets

(51) Int. Cl.
*H01M 4/60* (2006.01)
*H01M 4/36* (2006.01)
*B82Y 30/00* (2011.01)
*B82Y 40/00* (2011.01)
*H01M 4/02* (2006.01)
*H01G 11/26* (2013.01)
*H01G 11/06* (2013.01)
*H01M 4/86* (2006.01)
*H01M 12/08* (2006.01)
*H01G 11/46* (2013.01)
*H01G 11/36* (2013.01)
*H01M 4/88* (2006.01)
*H01M 4/90* (2006.01)

(52) U.S. Cl.
CPC ......... _H01M 10/0525_ (2013.01); *B82Y 30/00* (2013.01); *B82Y 40/00* (2013.01); *H01G 11/06* (2013.01); *H01G 11/26* (2013.01); *H01G 11/36* (2013.01); *H01G 11/46* (2013.01); *H01M 4/8605* (2013.01); *H01M 4/8673* (2013.01); *H01M 4/88* (2013.01); *H01M 4/9008* (2013.01); *H01M 12/08* (2013.01); *H01M 2004/021* (2013.01); *H01M 2004/8689* (2013.01); *Y02E 60/10* (2013.01)

(58) Field of Classification Search
CPC .. H01G 11/86; H01M 10/0525; H01M 12/08; H01M 2004/021; H01M 2004/8689; H01M 4/366; H01M 4/583; H01M 4/60; H01M 4/8605; H01M 4/8673; H01M 4/88; H01M 4/9008; Y02E 60/10
See application file for complete search history.

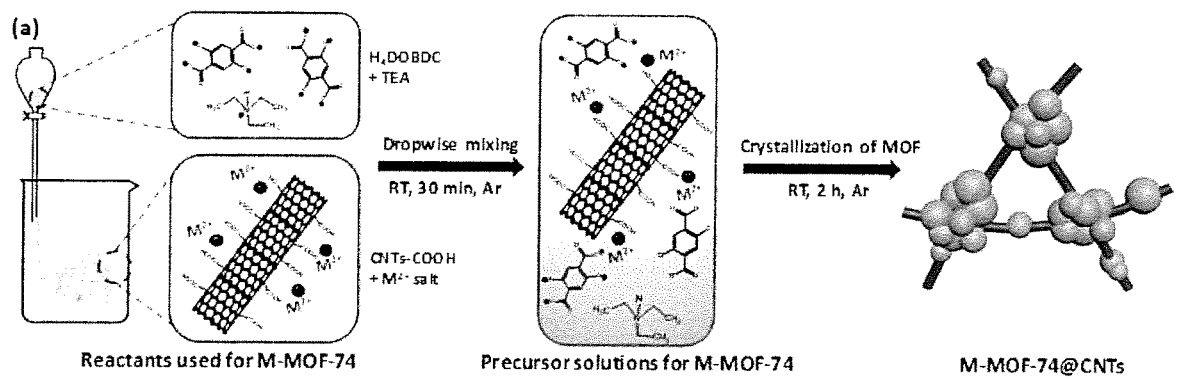
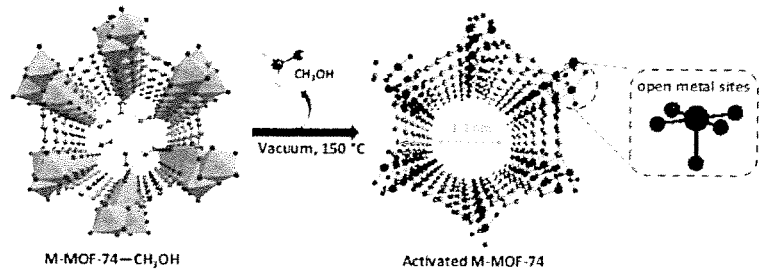 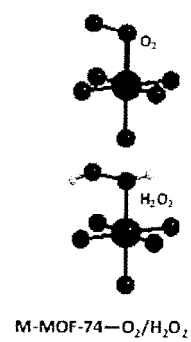
FIG. 1A
FIG. 1B
FIG. 1C

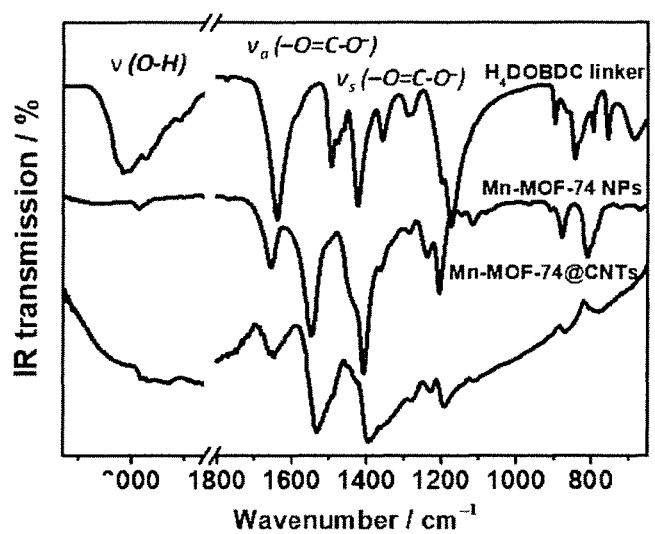
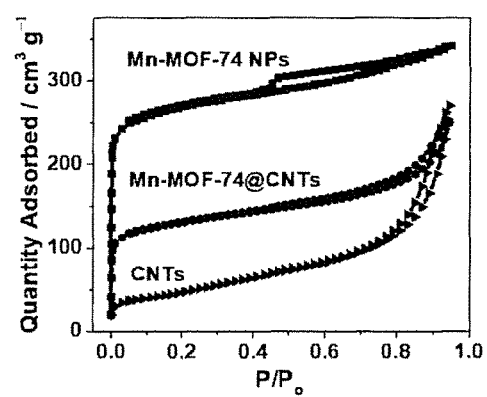
FIG. 5A
FIG. 5B

1st discharge   1st recharge (cycle)   15th cycle   >50th cycle

CATHODE MATERIALS FOR LITHIUM OXYGEN BATTERIES

CROSS-REFERENCE TO RELATED APPLICATION(S)

The present application claims under 35 U.S.C. § 119, the priority benefit of U.S. Provisional Application No. 62/672,826, filed May 17, 2018, entitled: "Cathode Materials for Lithium Oxygen Batteries". The disclosure of the foregoing application is incorporated herein by reference in its entirety
Field of the Invention The present invention relates to providing a high discharge capacity and a long cycle life of a lithium secondary battery. In particular, the embodiments herein relate to hybrid catalysts configured as catalytic cathode materials for $Li-O_2$ batteries to be operated in a humid oxygen environment.

BACKGROUND OF THE INVENTION

Discussion of the Related Art

Lithium-oxygen ($Li-O_2$) batteries have received much attention for next-generation energy storage devices due to their high specific energy. However, $Li-O_2$ batteries still face several challenges including low energy efficiency and poor cycle life, which are mainly caused by the low stability of electrolytes and cathodes towards aggressive reduced oxygen species, e.g., $O_2$-intermediate and $Li_2O_2$. A $Li_2O_2$ battery is based on oxygen reduction/evolution reaction (ORR/OER): $Li+O_2 \leftrightarrow Li_2O_2$. During discharge, oxygen from the air reacts with lithium ions to form to form lithium oxides, called "ORR". Upon recharge, oxygen evolved back to the environment, called "OER", and the Lithium goes back onto the anode.

However, $Li-O_2$ batteries still face several challenges that hinder their practical applications, such as low energy efficiency and poor cycle life. These problems are mainly caused by the relatively low stability of electrolytes and cathodes towards highly-aggressive reduced oxygen species ($O_2$ intermediate and $Li_2O_2$) and the insulating nature of discharge products. To improve the performance of $Li-O_2$ batteries, much research has been devoted to searching for highly efficient catalytic cathode materials to promote ORR/OER which is crucial to lowering overpotential an improving the cycle life.

Metal-organic frameworks (MOFs), a novel type of highly porous material, are built with metal nodes or clusters (secondary building units) and organic linkers. MOFs have been widely studied in gas storage, catalysis, and energy storage due to their remarkable properties including an ultra-large surface area (1000-10,000 $m^2\ g^{-1}$), well-defined channels that enable the fast diffusion of guest molecules, coordinatively-unsaturated open metal sites that are capable of inter-acting with incoming guest molecules, and the ease of tailoring properties for a given application and scale-up.

Unlike conventional inorganic catalysts where only the surface atoms participate in catalytic reactions, MOFs are a type of single-site-catalysts where every metal center is available for catalysis, leading to high atom utilization and much-enhanced activity. Unfortunately, most MOFs have intrinsically low electrical conductivity (e.g., Mn-MOF-74, $3 \times 10^{-3}$ S $cm^{-1}$), which hinders their use as electrode materials in electrochemical sensors, electrocatalysis, batteries, supercapacitors, and other applications that require effective conduction of electrons.

Accordingly, a need exists for a methodology and design for MOFs specifically tailored for $Li-O_2$ batteries so as to promote the conductivity of MOFs, such as, via the hybridization with conductive substrates and post-synthetic modification with guest molecules. In particular, the design and methodology (synthesis) of MOF, such as, but not limited to, MOF-74 is directly grown on carbon nanotubes (MOF-74@CNTs), as disclosed herein, via an additive-mediated synthesis at room temperature. Such novel hybrid catalysts result in effective catalytic cathode materials for $Li-O_2$ batteries to be operated in a umid oxygen environment. In these hybrids, one-dimensional CNTs are used as substrates for the growth of MOF-74 nanoparticles (NPs) to not only provide conductive networks but also to alleviate the agglomeration of MOF NPs so as to successfully enable the use of MOFs as effective cathode materials for $Li-O_2$ batteries. The embodiments herein thus address the desired need in the industry.

SUMMARY OF THE INVENTION

A particular aspect of the embodiments herein is directed to a method for forming a Metal-organic framework/carbon nanotubes (MOF@CNTs) hybrid cathode material for use as a cathode in a $Li-O_2$ ion battery, that includes: deprotonating an organic linker solution for a metal oxide framework (MOF); dropwise adding the organic linker solution into a mixture that includes carbon nanotubes (CNTs); and in situ growing a plurality of MOF NPs onto a functionalized carbon nanotubes (CNTs) substrate so as to form the MOF@CNTs hybrid cathode material.

Accordingly, Me-MOF-74 and Me-MOF-74@CNT hybrids were prepared via a facile additive-mediated synthesis as catalytic cathode materials for $Li-O_2$ batteries. The Mn-MOF-74-based oxygen cathode exhibited fewer side reactions during battery operation and a much-enhanced cycling performance in humid oxygen (up to 60 cycles) via the formation and decomposition of less reactive discharge product (i.e., LiOH) by the nano-architectured MOF@CNT hybrid catalyst. Besides, air contains moisture indicated by relative humidity and thus it is highly costly to obtain/maintain a very dry oxygen that are commonly used for $Li-O_2$ batteries. Therefore, the invention disclosed herein significantly improves a batteries performance and also reduces the cost by cycling the $Li-O_2$ batteries in humid oxygen with MOF@CNT hybrid catalyst.

BRIEF DESCRIPTION OF THE DRAWINGS

FIG. 1A illustrates a preparation process of the Me-MOF-74@CNT hybrid disclosed herein.

FIG. 1B shows the shows the activation process and crystal structure of Mn-MOF-74 that has well-defined 1D channels with a diameter of 11 Å and open metal sites after activation.

FIG. 1C illustrates the interaction between open metal sites and incoming guest molecules (i.e., $O_2$ and hydrogen peroxide $H_2O_2$).

FIG. 5A shows FTIR spectra of CNTs, MOF-74 NPs, and Mn-MOF-74@CNT hybrid.

FIG. 5B shows $N_2$ physisorption isotherms of CNTs, MOF-74 NPs, and Mn-MOF-74@CNT hybrid.

FIG. 18E show an SEM image of a discharged Mn-MOF-74@CNT cathode at a 500 mA g$^{-1}$ current densities (inset scale bar: 5 μm).

DETAILED DESCRIPTION

Figure 2A:
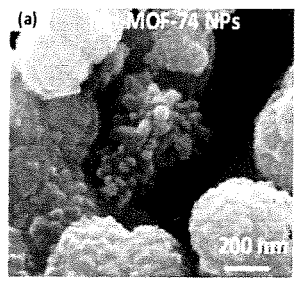
FIG. 2A shows a scanning electron microscopy (SEM) image of Mn-MOF-74 nanoparticles (NP).
Figure 2B:
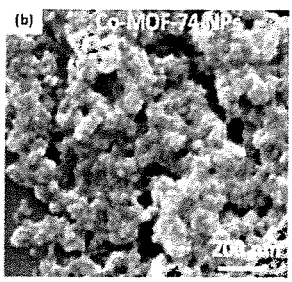
FIG. 2B shows a scanning electron microscopy (SEM) image of Co-MOF-74 nanoparticles (NP).
Figure 2C:
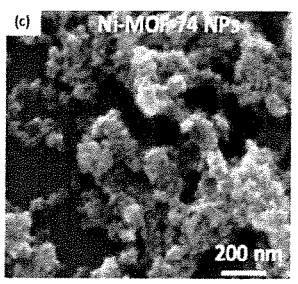
FIG. 2C shows a scanning electron microscopy (SEM) image of Ni-MOF-74 nanoparticles (NP).
Figure 2D:
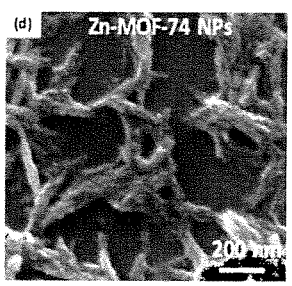
FIG. 2D shows a scanning electron microscopy (SEM) image of Zn-MOF-74 nanoparticles (NP).
Figure 2E:
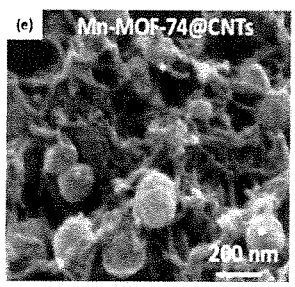
FIG. 2E shows a scanning electron microscopy (SEM) image of a Mn-MOF-74@CNT hybrid.
Figure 2F:
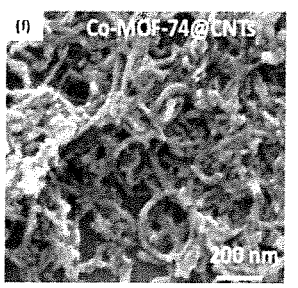
FIG. 2F shows a scanning electron microscopy (SEM) image of a Co-MOF-74@CNT hybrid.
Figure 2G:
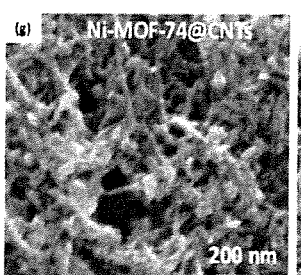
FIG. 2G shows a scanning electron microscopy (SEM) image of a Ni-MOF-74@CNT hybrid.
Figure 2H:
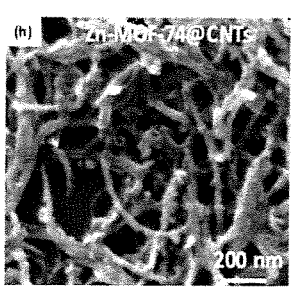
FIG. 2H shows a scanning electron microscopy (SEM) image of a Zn-MOF-74@CNT hybrid.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

General Description

As briefly discussed above, the embodiments herein are directed to the design and synthesis of MOF-74 directly grown on carbon nanotubes (MOF-74@CNTs) via additive-mediated synthesis at room temperature. Such resultant hybrid catalysts operate as effective catalytic cathode materials for Li—$O_2$ batteries to be utilized in a humid oxygen environment. In these hybrids, one-dimensional CNTs are used as substrates for the growth of MOF-74 nanoparticles (NPs) to not only provide conductive networks but also to alleviate the agglomeration of MOF NPs, so as to successfully enable the use of MOFs as effective cathode materials for Li—$O_2$ batteries.

Beneficially, as disclosed herein, conformal coating of $Li_2O_2$ is deposited on the surface of Mn-MOF-74@CNTs cathode in dry oxygen, whereas flake-like LiOH crystals are formed in humid oxygen containing (e.g., ≥200 ppm moisture). Due to the catalytic formation of less-reactive LiOH (compared to $Li_2O_2$), the Mn-MOF-74@CNTs-based oxygen cathode exhibits less side reactions during battery operation and much-enhanced cycling performance in ≥200 ppm humid oxygen than that in dry oxygen and also than that of conventional carbon-based cathodes.

Accordingly, a basis of the embodiments herein is directed to providing a reaction mechanism of the chemically catalyzed conversion of $Li_2O_2$ to LiOH as the final discharge product occurring at $Mn^{2+}/Mn^{3+}$ metal centers in the Mn-MOF-74@CNTs hybrid, instead of the electrocatalytic formation of LiOH.

Specific Description

Turning now to the drawings, FIG. 1A, FIG. 1B, and FIG. 1C schematically illustrates the novel fabrication process of the Mn-MOF-74@CNTs hybrid as disclosed herein. It is to be appreciated that the synthetic procedure of Me-MOF-74 (Me can be for example, Mn, Co, Ni, Fe, and Zn) nanoparticles is similar to that of a Me-MOF-74@CNTs hybrid except without the addition of CNTs.

First, as shown in FIG. 1A, the organic linker for MOF-74, 2,5-dihydroxyterephthalic acid ($H_4$DOBDC), was deprotonated by triethylamine additive (TEA, $pK_b$: 3.25). To avoid the nucleation of MOF-74 in the bulk solution, the deprotonated linker solution was dropwise added into the mixture of $Mn^{2+}$/CNTs and then MOF-74 NPs were grown in situ onto CNTs functionalized with carboxyl (—COOH) groups that serve as nucleation sites. It is to be appreciated that the first step of pre-deprotonation of $H_4$DOBDC by TEA instead of direct addition of TEA into the mixture of $H_4$DOBDC and $Mn^2$ is to mitigate the hydrolysis of $Mn^{2+}$ ($Mn^{2+}+OH^- \leftrightarrow Mn(OH)_2$) caused by the organic base of TEA. FIG. 1B shows the activation process and crystal of Mn-MOF-74 that has well-defined 1D channels with a diameter of 11 Å and open metal sites after activation. FIG. 1C depicts the interaction between open metal sites and incoming guest molecules (i.e., $O_2$ and hydrogen peroxide $H_2O_2$).

To aid the reader in understanding the possible various embodiments of the present invention, the following provides reference when considering designing the embodiments herein, which is intended to be illustrative only, but not limiting thereof.

EXAMPLE

Preparation of Me-MOF-74 (Me=Mn, Co, Ni, Zn, Fe)

It is noted that 0.34 mmol of 2,5-dihydroxyterephthalic acid ($H_4$DOBDC, 0.0674 g) and 2.36 mmol of triethylamine (TEA, 0.33 mL) were dissolved into 20 mL of N,N-Dimethylformamide (DMF), ethanol (EtOH), and water ($H_2O$) solution (15:1:1, v/v) to form a clear dark brown solution A. 1.088 mmol of metal salts ($MnCl_2 \cdot 4H_2O$, $Co(NO_3)_2 \cdot 6H_2O$, $Ni(NO_3)_2 \cdot 6H_2O$, $Zn(NO_3)_2 \cdot 6H_2O$) was dissolved into 130 mL of DMF+EtOH+$H_2O$ solution (15:1:1, v/v) to form a clear solution B. As for Fe-MOF-74, anhydrous DMF was used as the solo solvent rather than the mixture of DMF+EtOH+$H_2O$ and anhydrous iron chloride ($FeCl_2$) was used rather than metal salt hydrate. Solution A was dropwise added into solution B under agitatedly stirring under argon, and kept stirring for 2 h. Afterwards, the precipitates were collected via centrifugation at 3000 rpm, re-dispersed in 80 ml of DMF, and heated at 50° C. for 6 h. The DMF washing step was repeated 2 more times to remove unreacted ligand. The nanocrystals were then collected by centrifugation, re-dispersed in 80 ml of methanol, and heated at 50° C. for 6 h. The methanol washing step was repeated 5 more times to exchange all the DMF to methanol. Finally, MOF-74 nanocrystals were fully dried at 50° C. for 12 h under vacuum.

Preparation of Me-MOF-74@CNT (Me=Mn, Co, Ni, Zn, Fe)

It is noted that 0.34 mmol of $H_4$DOBDC (0.0674 g) and 2.36 mmol of TEA (0.33 mL) were dissolved into 20 mL of DMF+EtOH+$H_2O$ solution (15:1:1, v/v) to form a clear dark brown solution A. 1.088 mmol of metal salts ($MnCl_2 \cdot 4H_2O$, $Co(NO_3)_2 \cdot 6H_2O$, $Ni(NO_3)_2 \cdot 6H_2O$, $Zn(NO_3)_2 \cdot 6H_2O$) was dissolved into 130 mL of DMF+EtOH+$H_2O$ solution (15:1:1, v/v) to form a clear solution, and then, 100 mg of carbon nanotubes (CNTs) was dispersed into above metal salt solution via ultrasonication for 30 min, to form mixture B. As for Fe-MOF-74@CNT, anhydrous DMF was used as the solo solvent rather than the mixture of DMF+EtOH+$H_2O$ and anhydrous $FeCl_2$ was used rather than metal salt hydrate. Next, solution A was dropwise added into mixture B under agitatedly stirring under argon, and kept stirring for 2 h. Afterwards, the precipitates were collected via centrifugation at 3000 rpm, re-dispersed in 80 ml of DMF, and heated at 50° C. for 6 h. The DMF washing step was repeated 2 more times to remove unreacted ligand. The nanocrystals were then collected by centrifugation, re-dispersed in 80 ml of methanol, and heated at 50° C. for 6 h. The methanol washing step was repeated 5 more times to exchange all the DMF to methanol. Finally, MOF-74@CNTs hybrids were fully dried at 50° C. for 12 h under vacuum.

Materials Characterization:

The morphology of as-prepared MOFs powders and $O_2$ cathodes was characterized by SEM (FEI Quanta 200F). The phase of as-prepared MOFs powders was identified by XRD (Rigaku diffractometer with Cu Kα radiation, λ=1.5418 nm). FTIR spectra were obtained by Nicolet iS10 FT-IR Spectrometer (Thermo Scientific) with a resolution of 4 $cm^{-1}$ in a range of 600-4000 $cm^{-1}$. XPS spectra were measured using a Kratos AXIS-165 with a monochromatized Al Kα X-ray anode (1486.6 eV) that was calibrated against the Au 4f 7/2 peak at 84.0 eV and the Ag 3d 5/2 peak at 368.3 eV. All XPS spectra were calibrated using the C1s peak of adventitious hydrocarbons at 285.0 eV. The thermal stability and ratio of MOFs to CNT of as-prepared MOFs powders was investigated by TGA (TA Instruments Thermogravimetric Analyzers). The surface areas and pore volumes of MOF-74 and CNTs samples were estimated based on $N_2$ physisorption at 77 K using ASAP 2020 plus physisorption analyzer (Micromeritics), respectively. Prior to the $N_2$ physisorption measurement, the samples were activated at 150° C. for 10 hours.

Electrochemical Characterization:

An $O_2$ electrode was prepared by mixing MOFs with Ketjenblack EC600JD (KB-600) and carbon nanofibers (CNFs) as a conducting agent and polyvinylidene fluoride (PVdF) as a binder and then casting the mixture on carbon paper, followed by heating at 150° C. under vacuum for 24 h. The mass loading of total carbon (i.e., KB, CNTs, CNFs) was kept at 0.5±0.1 $mg/cm^2$. CR2032-type coin cells with open mesh were assembled by sandwiching a separator (glass fibre) between a lithium metal foil and $O_2$-breathing cathode in a glove box filled with ultrahigh-purity argon gas (MBraun, $H_2O$<0.5 ppm and $O_2$<0.5 ppm). The electrolyte was made by 1 M of bis(trifluoromethane)sulfonimide lithium salt (LiTFSI) dissolved in tetra(ethylene) glycol dimethyl ether (TEGDME). The water content in the electrolyte used in this study was <5 ppm measured using a C20 compact Karl Fisher coulometer (Metter Toledo) with the sample size of ~3 g. Li—$O_2$ batteries were encased in a 500-mL container filled with high-purity $O_2$ prior to testing at 30° C. under 1 atm (760 Torr). The moisture level in oxygen was measured using a precision humidity analyzer (EQ-RH-800-LD, MTI Corporation). Constant-current discharge and a charge test using a battery cycler was performed to evaluate energy efficiency, lifetime, and the power (or rate) capability of Li—$O_2$ coin cells. The capacity is normalized by the total carbon. The coin cells were tested at a current rate of 125 mA/g with a voltage between 2.0 to 4.6 V. The electrochemical impedance spectroscopy of the cells was obtained using BioLogic potentiostat with 10 mV amplitude in frequency range of 1 MHz-0.01 Hz. Cyclic voltammetry was performed in the rage of 2.0-4.6 V using BioLogic potentiostat.

Turning back to the drawings/figures, FIG. 2A, FIG. 2B, FIG. 2C, and FIG. 2D show scanning electron microscopy (SEM) images of Mn-MOF-74, Co-MOF-74, Ni-MOF-74, and Zn-MOF-74 respectively while FIG. 2E, FIG. 2F, FIG. 2G, and FIG. 2H show a comparison of SEM images of Mn-MOF-74@CNT, Co-MOF-74@CNT, Ni-MOF-74@CNT, Zn-MOF-74@CNT hybrids, as disclosed herein. Accordingly, compared to pure MOF nanoparticles, the SEM images of Mn-MOF-74@CNT, Co-MOF-74@CNT, Ni-MOF-74@CNT, Zn-MOF-74@CNT hybrids illustrated that MOF-74 nanoparticles directly grown on CNTs exhibited a better distribution of MOF particles and a good contact between MOF particles and CNTs in such hybrid materials. This unique architecture of Me-MOF-74@CNT hybrids is in a novel fashion achieved by introducing CNTs to not only mitigate the aggregation of MOF-74 NPs but to also enhance the conductivity of MOFs. Moreover, the woven porous CNTs structure in the hybrid materials as shown in the SEM images has been demonstrated to enhance mass transport of oxygen and $Li^+$ ions, compared to the aggregated MOF NPs. This is due to the effective diffusion coefficient in porous materials $D_i^{eff}=D_i f(\varepsilon)$, where $D_i$ is the diffusion coefficient and $f(\varepsilon)$ is an increasing function of porosity ε.

Figure 3A:
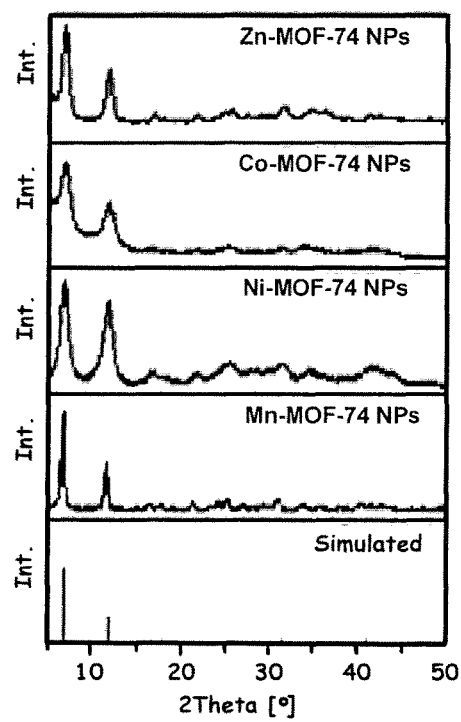
FIG. 3A shows powder X-Ray diffraction (PXRD) patterns of Me-MOF-74 nanoparticles.
Figure 3B:
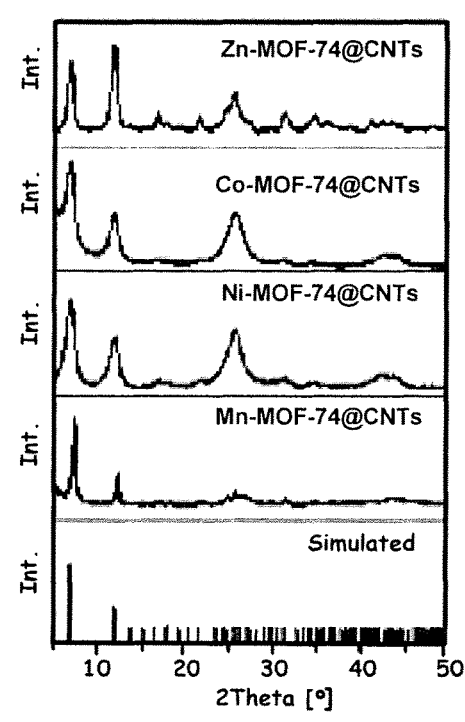
FIG. 3B shows powder X-Ray diffraction (PXRD) patterns of Me-MOF-74@CNT hybrids (Me=Mn, Co, Zn, Ni).
Figure 4A:
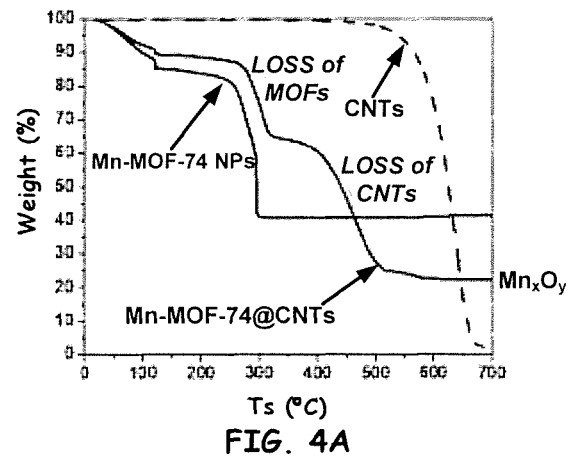
FIG. 4A shows thermogravimetric analysis (TGA) curves of CNTs, Mn-MOF-74 NPs and Mn-MOF-74@CNT hybrids.
Figure 4B:
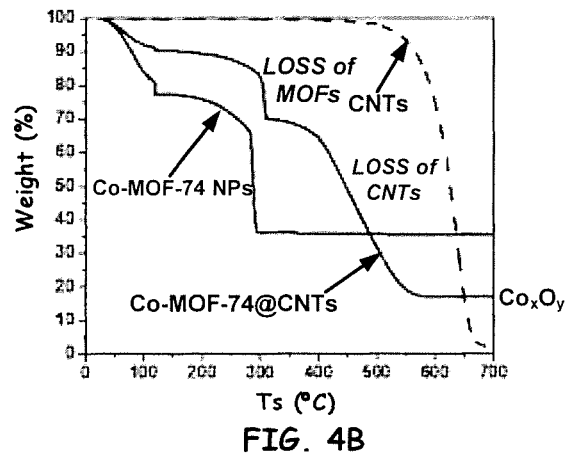
FIG. 4B shows thermogravimetric analysis (TGA) curves of CNTs, Co-MOF-74 NPs and Co-MOF-74@CNT hybrids.
Figure 4C:
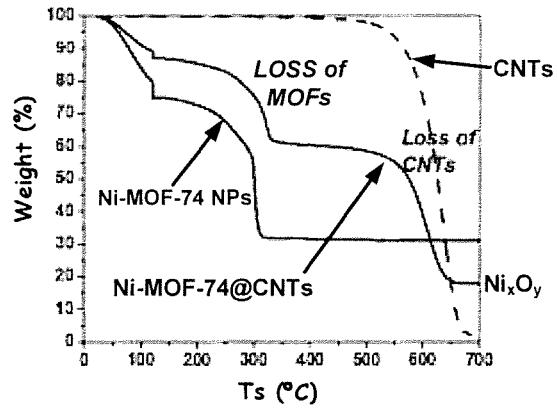
FIG. 4C shows thermogravimetric analysis (TGA) curves of CNTs, Ni-MOF-74 NPs and Ni-MOF-74@CNT hybrids.
Figure 4D:
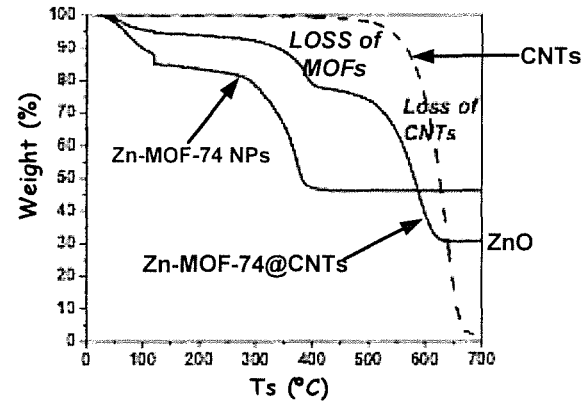
FIG. 4D shows thermogravimetric analysis (TGA) curves of CNTs, Zn-MOF-74 NPs and Zn-MOF-74@CNT hybrids.

FIG. 3A and FIG. 3B show powder X-Ray diffraction (PXRD) patterns of Me-MOF-74 nanoparticles and Me-MOF-74@CNT hybrids (Me=Mn, Co, Zn, Ni). The powder X-ray diffraction (PXRD) patterns of as-prepared MOFs samples were matched well with simulated MOF-74 peaks, indicating a series of successfully synthesized crystalline MOF-74 and MOF-74@CNT hybrids. The broad peak width in the PXRD patterns can be attributed to the peak broadening of MOF nanocrystals.

FIG. 4A, FIG. 4B, FIG. 4C, and FIG. 4D show thermogravimetric analysis (TGA) curves of CNTs, Me-MOF-74 NPs and Me-MOF-74@CNT hybrids (Me=Mn, Co, Zn, Ni). Such thermogravimetric analysis (TGA) curves of as-prepared MOF samples revealed that MOF-74 has a good thermal stability up to 250° C., which is below the typical drying temperature used for the fabrication of cathodes at 150° C. The ratio of MOFs to CNTs was calculated by the following equation:

$$Residual_{CNTs}\% \times w_{CNTs}\% + Residual_{MOFs}\% \times w_{MOFs}\% = Residual_{MOFs/CNTs}\%$$

After calculation, the ratio of MOF to CNT in MOF@CNT hybrids is determined to be 48.8%:51.2% (ca. 1:1), 38.0%:62.0% (ca. 1:2), 46.6%:53.4% (ca. 1:1), and 58.0%:42.0% (ca. 1:1) for Mn-MOF-74@CNT, Co-MOF-74@CNT, Ni-MOF-74@CNT and Zn-MOF-74@CNT hybrids, respectively, as shown in Table 1 below.

TABLE 1

| Sample | MOF content (%) | CNTs content (%) | Comment |
|---|---|---|---|
| Mn-MOF-74@CNTs | 48.8 | 51.2 | ca. 1:1 |
| Co-MOF-74@CNTs | 38.0 | 62.0 | ca. 1:2 |
| Ni-MOF-74@CNTs | 46.6 | 53.4 | ca. 1:1 |
| ZnMOF-74@CNTs | 58.0 | 42.0 | ca. 1:1 |

It is to be note that further systematic experiments were performed to fully understand the properties and performance of Me-MOF-74@CNT hybrids using Mn-MOF-74 as a model.

FIG. 5A shows FTIR spectra and FIG. 5B shows $N_2$ physisorption isotherms of CNTs, MOF-74 NPs, and Mn-MOF-74@CNT hybrid respectively. In particular, FIG. 5A shows Fourier transform infrared spectroscopy (FTIR) spectrum wherein Mn-MOF-74 has two large peaks at 1405 and 1545 cm$^{-1}$, corresponding to symmetric and asymmetric vibrations of coordinated carboxylate groups (—COO$^-$) with Mn$^{2+}$ ions. Meanwhile, the absence of the vibration band of hydroxyl (—OH) groups indicates that no metal hydroxide impurities are present in Mn-MOF-74 samples.

The $N_2$ physisorption isotherms at 77 K shown in FIG. 5B illustrate that both pure Mn-MOF-74 NPs and Mn-MOF-74@CNTs hybrid exhibit a high $N_2$ uptake at the low-pressure region, indicating the presence of large amount of micropores. As shown in Table 2, below the Mn-MOF-74 NPs possess a Brunauer-Emmett-Teller (BET) surface area of 953 m$^2$ g$^{-1}$, which is comparable to that reported for MOF-74 bulk crystals solvothermally synthesized (1000-1200 m$^2$ g$^{-1}$).

TABLE 2

| Sample | BET surface area/m$^2$ g$^{-1}$ | Pore volume/ cm$^3$ g$^{-1}$ |
|---|---|---|
| Mn-MOF-74 NPs | 953 | 0.2 |
| CNTs | 163 | 0.42 |
| Mn-MOF-74@CNTs | 462 | 0.26 |

Such high BET surface area and large amount of micropores revealed that the highly porous structure of MOFs does not collapse after solvent exchange and activation process, further confirming its high crystallinity in good agreement with PXRD results. In addition, Mn-MOF-74@CNT hybrid has about half of the BET surface area of Mn-MOF-74 NPs (462 m$^2$ g$^{-1}$), which is attributed to the low BET surface area of CNTs (163 m$^2$ g$^{-1}$), in agreement with the TGA analysis (~1:1 ratio).

Figure 6:
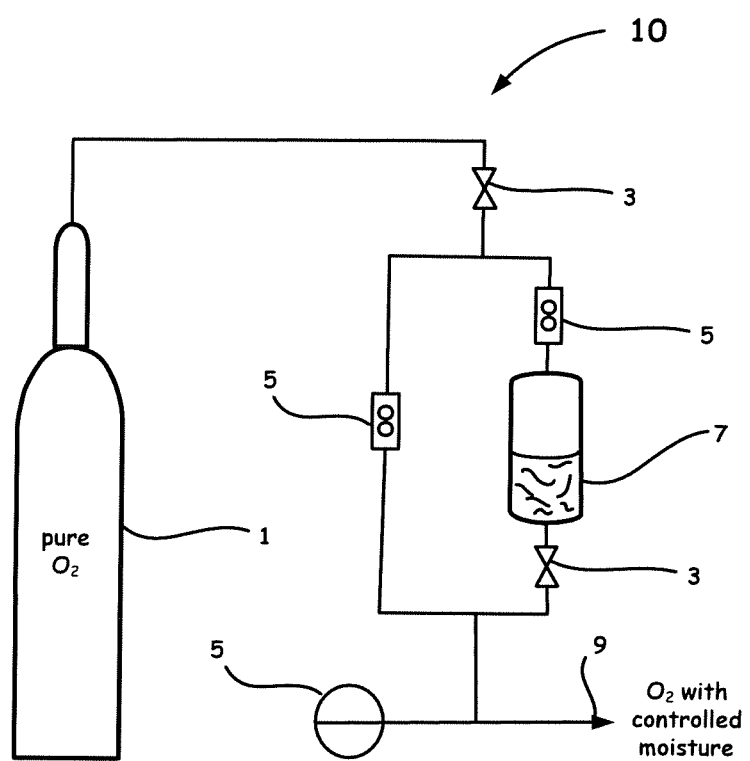
FIG. 6 shows an example embodiment of an oxygen feed system, as utilized herein.
Figure 7:
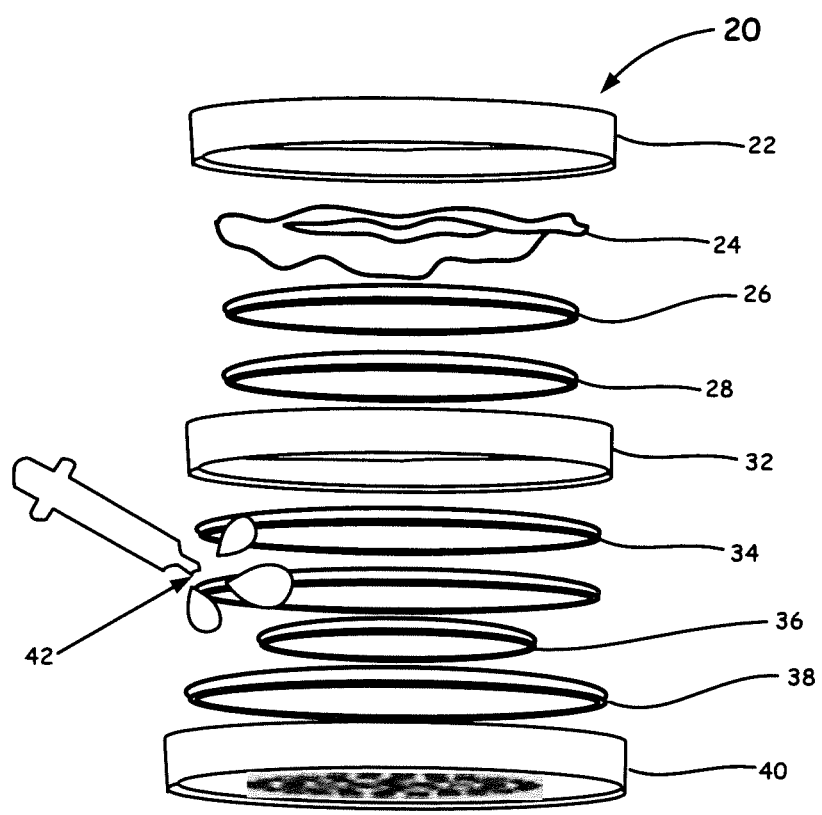
FIG. 7 shows a schematic of a Li—$O_2$ cell configuration.

FIG. 6 illustrates an example schematic embodiment of an oxygen feed system, as generally designated by the reference numeral 10, that generates humid oxygen with controlled moisture level to provide the various Me-MOF-74@CNTs s (e.g., cathodes) as utilized herein. In particular, the system 10 of FIG. 6 shows a pure oxygen ($O_2$) source 1, one or more valves 3, one or more flow meters 5, a water supply source 7, and an outlet 9 (as also denoted by the directional arrow) so as to provide $O_2$ with controlled moisture. While the system 10 of FIG. 6 is beneficial for illustrative purposes, it is to be understood that other alternative commercial and custom configurations and having various other components, as known and as understood by those of ordinary skill in the art, can also be incorporated when using an oxygen feed system as shown in FIG. 2A and as disclosed herein. To evaluate the stability of electrolyte, linear sweep voltammetry (LSV) was performed at the range of open circuit voltage (OCV) to 5.0 V. FIG. 7 generally illustrates the configuration of a Li—$O_2$ cell, as generally designated by the reference numeral 20. Such components, as generally understood in the art, includes an anode cap 22, a wave spring 24, a spacer 26, a Lithium anode (foil) 28, a gasket 32, a GF/D (glass fiber membrane separator) or MOFs (MOF-coated)/GF/D 34, a Celgard membrane 34 between the GF/D or MOF-coated GF/D separator 34 and a cathode 36, Nickel foam 38, a Cathode case with open mesh 40, and an applied electrolyte 42. More detail of the cell 20 is as follows.

An $O_2$ electrode was prepared by mixing non-activated MOF@CNTs hybrids (60 wt %) with Ketjenblack EC600JD (KB-600, AkzoNobel, 25 wt %) and carbon nanofibers (CNFs, PyrografProducts, 5 wt %) as a conducting agent and polyvinylidene fluoride (PVdF, MTI Corporation 10 wt %) as a binder and then casting the mixture on carbon paper, followed by heating at 150° C. under vacuum for 24 h. It is noted that the MOF content in the oxygen cathodes is only ~30 wt %. It is also worth noting that the activation of MOFs and the drying of cathodes are combined in one step. The mass loading of total carbon (i.e., KB-600, CNTs, and CNFs) was kept at 0.5±0.1 mg cm 2. CR2032-type coin cells (Wellcos Corporation) with open meshes were assembled by sandwiching the glass fiber membrane (GF/D, Whatman) as a separator between the lithium metal foil and the $O_2$-breathing cathode in a glove box filled with high-purity argon gas (MBraun, $H_2O$<0.5 ppm and $O_2$<0.5 ppm).

To facilitate the recovery of discharged and recharged cathodes and to avoid the direct contact between KB-600 cathode and GF/D separator, an extra polypropylene membrane (Celgard 2400) was placed between the cathode and GF/D separator. The electrolyte was made using 1 M of bis(trifluoromethane)sulfoni-mide lithium salt (LiTFSI, 99.95%, Sigma-Aldrich) dissolved in tetra-ethylene glycol dimethyl ether (TEGDME, 99%, Sigma-Aldrich) that was stored over 4 A molecular sieves (Alfa Aesar) for at least one week prior to use. The water content in the electrolyte used in this study was <5 ppm measured using a C20 compact Karl Fisher coulometer (Metter Toledo) with the sample size of ~3 g. Li—$O_2$ cell was encased in a 500-mL container that was purged for 20 min with 1 atm (760 Torr) of high-purity $O_2$ at different moisture level and rested for 6 hours prior to testing at room temperature. The moisture level in oxygen was measured using a precision humidity analyzer (EQ-RH-800-LD, MTI Corporation). Constant-current discharge and charge tests with a voltage between 2.0 and 4.6 V vs. Li/Li$^+$ using a battery cycler (Neware BTS 3000) were performed to evaluate energy effi-ciency, lifetime, and the power (or rate) capability of Li—$O_2$ coin cells. The EIS spectra and CV curves of the cells were obtained using Bio-Logic potentiostat SP-200.

Figure 8A:
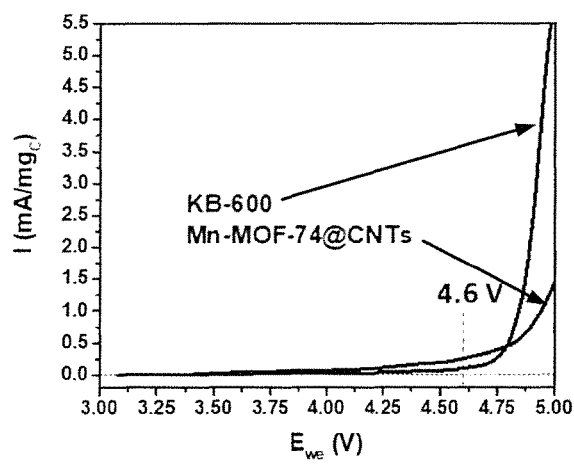
FIG. 8A shows LSV of KB-600 and Mn-MOF-74@CNT between 3.0 V and 5.0 V at the rate of 0.2 mV/s.
Figure 8B:
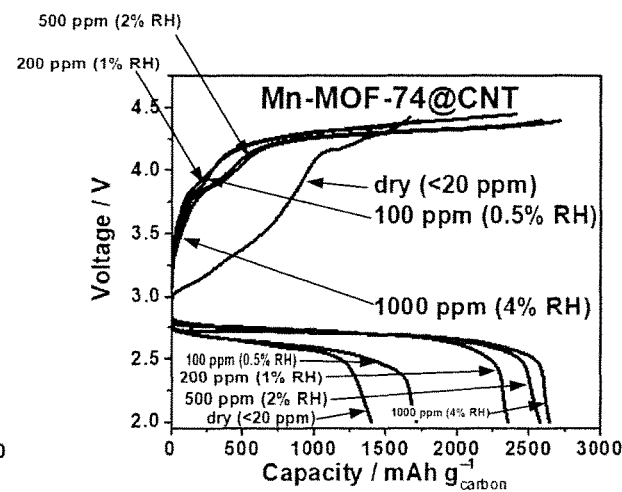
FIG. 8B shows full discharge-charge profiles of Mn-MOF-74@CNT cathodes at 125 mA g$^{-1}$ in dry oxygen (<20 ppm) and in humid oxygen containing 100 ppm, 200 ppm, 500 ppm, and 1000 ppm moisture, respectively.

FIG. 8A shows LSV of KB-600 and Mn-MOF-74@CNT between 3.0 V and 5.0 V at the rate of 0.2 mV/s. FIG. 8B shows full discharge-charge profiles of Mn-MOF-74@CNT cathodes at 125 mA g$^{-1}$ in dry oxygen (<20 ppm) and in humid oxygen containing 100 ppm, 200 ppm, 500 ppm, and 1000 ppm moisture, respectively. FIG. 8A further shows a result wherein the electrolyte coupled with Mn-MOF-74@CNTs cathode is relatively stable up to 4.75 V. FIG. 8B in particular shows the full discharge and charge profiles of Mn-MOF-74@CNT cathodes tested in oxygen with different moisture levels. It is noted that cell capacity and mass loading are calculated by the total weight of carbon, kept at ~0.5 mg$_{carbon}$ cm$^{-2}$. The discharge capacity increases (from 1400 mAh g$^{-1}$ up to about 2500 mAh g$^{-1}$) with increasing moisture levels at a current rate of 125 mA g$^{-1}$.

FIGS. 9A-9F show SEM images of Mn-MOF-74@CNTs cathodes: (a) pristine, (b-f) full discharged at 125 mA g$^{-1}$ in dry oxygen and in humid oxygen containing 100 ppm, 200 ppm, 500 ppm, and 1000 ppm moisture, respectively. Inset: the digital photos of corresponding lithium anode after full discharge. Note that LiOH flakes are marked by a bracketed denoted white rectangle in (FIGS. D-F). In particular, the morphologies of discharge products of Mn-MOF-74@CNT cathodes were further examined by SEM as shown in FIGS. 9A-9F.

Figures 9A, 9B, 9C:
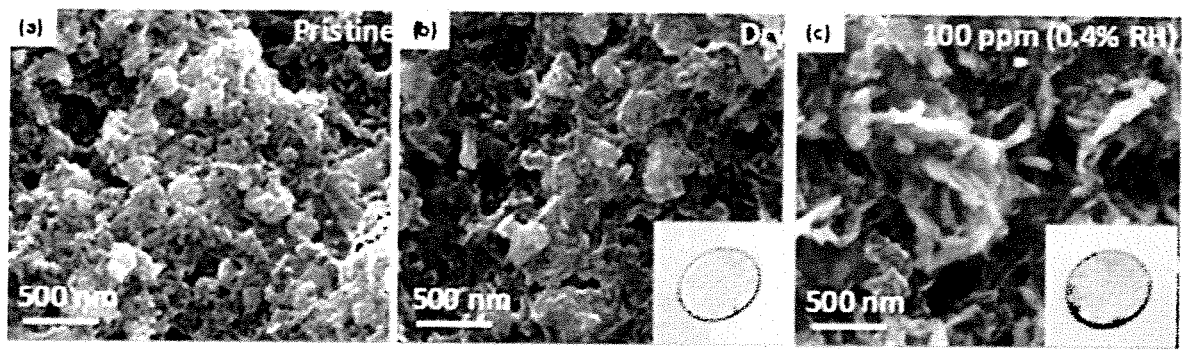
FIG. 9A shows an SEM image of a pristine Mn-MOF-74@CNTs cathodes.
FIG. 9B shows an SEM image of a full discharged at 125 mA g$^{-1}$ in dry oxygen Mn-MOF-74@CNTs cathode.
FIG. 9C shows an SEM image of a Mn-MOF-74@CNTs cathode in humid oxygen containing 100 ppm.
Figures 9D, 9E, 9F:
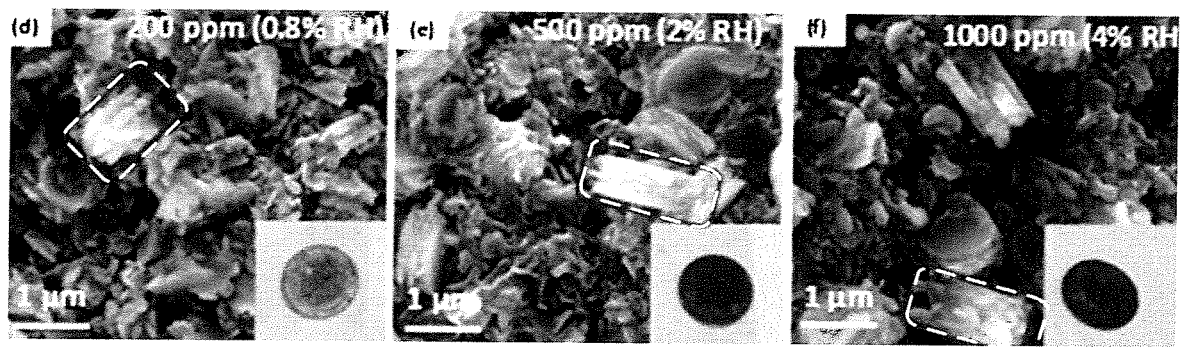
FIG. 9D shows an SEM image of a Mn-MOF-74@CNTs cathode in humid oxygen containing 200 ppm.
FIG. 9E shows an SEM image of a Mn-MOF-74@CNTs cathode in humid oxygen containing 500 ppm.
FIG. 9F shows an SEM image of a Mn-MOF-74@CNTs cathode in humid oxygen containing 1000 ppm.

In dry oxygen, the conformal thin-film coating of $Li_2O_2$ deposited at the surface of the cathode (see FIG. 9B), leading to relatively low discharge capacity. In sharp contrast, large disk-shaped aggregates of LiOH nanoflakes with a diameter of 1-2 μm were formed at some spots and small toroids of LiOH fully covered the rest of the cathode surface in humid oxygen containing ≥200 ppm moisture (FIGS. 9D-9F), giving rise to relatively large discharge capacity. It should be noted that when the discharge capacity reaches up to ~2500 mAh $g^{-1}$, it changes too little to be distinguishable most likely due to the limited space of cathodes for accommodating the micrometer-sized discharge products as shown in FIGS. 9D-9E.

Figure 10A:
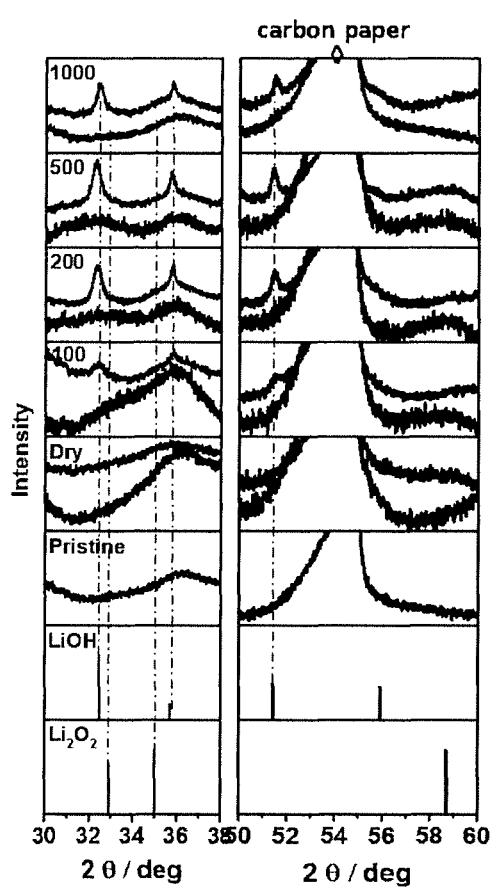
FIG. 10A shows corresponding XRD patterns of full discharged and recharged Mn-MOF-74@CNT cathodes described in FIGS. 8A and 8B.
Figure 10B:
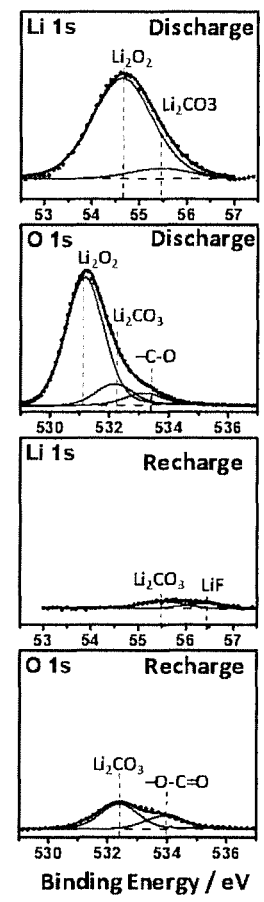
FIG. 10B shows XPS spectra of Mn-MOF-74@CNT cathode in dry oxygen.

FIG. 10A shows corresponding XRD patterns of full discharged and recharged Mn-MOF-74@CNT cathodes described in FIG. 8A-8B (Note that the curve with 40% transparency shows the XRD pattern of recharged cathode). FIG. 10B shows XPS spectra of Mn-MOF-74@CNT cathode in dry oxygen. Accordingly, the ex-situ analysis of fully discharged and recharged Mn-MOF-74@CNTs cathodes using PXRD (FIG. 10A) confirms the formation and decomposition of LiOH in humid oxygen, revealing the good reversibility of Li—$O_2$ battery via the formation/decomposition cycle of less-reactive LiOH (compared to $Li_2O_2$). Efforts to study the composition of discharge product in dry oxygen using PXRD were unsuccessful, however, owing to the poor crystallinity of the film-like discharge product (see FIG. 9B and FIG. 10A). In this regard, X-ray photoelectron spectroscopy (XPS) was used to identify the formation and decomposition of the discharge product under dry condition. The XPS spectra (FIG. 10B) of Mn-MOF-74@CNTs cathodes in dry oxygen show that $Li_2O_2$(Li 1s: 54.5 eV and O 1s: 531.1 eV) was formed as the main discharge product, instead of LiOH. This observation clearly demonstrates that the proton source for the formation of LiOH is the moisture presented in the humid oxygen. After recharge, the Li is peak at 54.5 eV corresponding to that of $Li_2O_2$ disappeared but small amounts of $Li_2CO_3$ (Li 1s: 55.5 eV and O 1s: 532.2 eV) and LiF (Li 1s: 56.2 eV) were formed at the surface of the cathode.

Figure 11A:
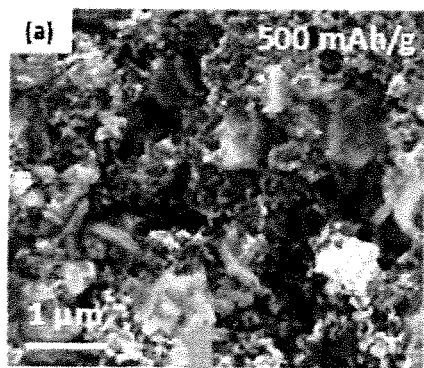
FIG. 11A shows an SEM image of a discharged Mn-MOF-74@CNTs cathode at 500 mAh g$^{-1}$.
Figure 11B:
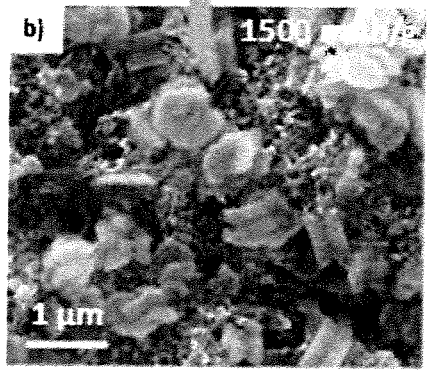
FIG. 11B shows an SEM image of a discharged Mn-MOF-74@CNTs cathode at 1500 mAh g$^{-1}$.
Figure 11C:
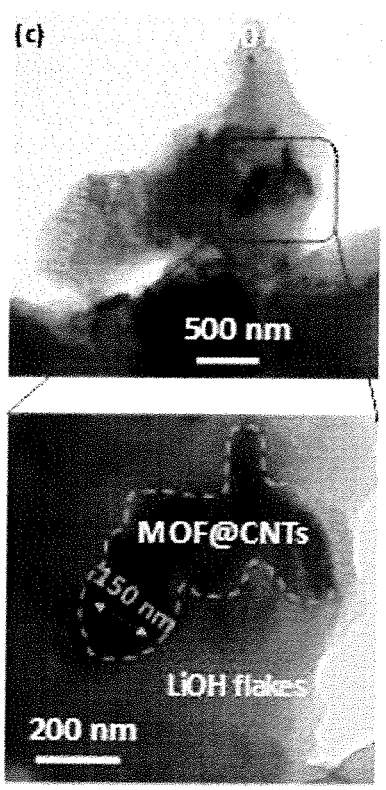
FIG. 11C shows a TEM image of a discharged Mn-MOF-74@CNTs cathode at 1500 mAh g$^{-1}$.

FIG. 11A shows an SEM image of a discharged Mn-MOF-74@CNTs cathode at 500 mAh $g^{-1}$. FIG. 11B shows an SEM image of a discharged Mn-MOF-74@CNTs cathode at 1500 mAh $g^{-1}$ 1. FIG. 11C shows a TEM image of a discharged Mn-MOF-74@CNTs cathode at 1500 mAh $g^{-1}$. Note that Mn-MOF-74@CNTs hybrid is marked by a dashed encircling in FIG. 11C.

To further understand how the morphology of LiOH evolves upon discharging in humid oxygen, the cathodes at different state of discharge were examined by SEM. When discharging to 500 mAh $g^1$, LiOH nanoflakes formed preferably at MOF NPs (FIG. 11A). Then, LiOH nanoflakes grew larger as the discharge process proceeded to 1500 mAh $g^{-1}$ (FIG. 11B). At the end of discharge, LiOH nanoflakes fully covered the cathode surface, resulting in the sudden death of the cell. TEM images of the discharged cathode at 1500 mAh $g^{-1}$ (FIG. 11C) further support the formation of LiOH at MOF NPs.

Figure 12A:
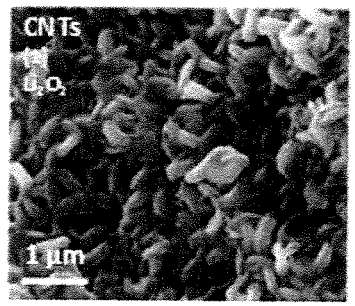
FIG. 12A shows an SEM image of CNTs.
Figure 12B:
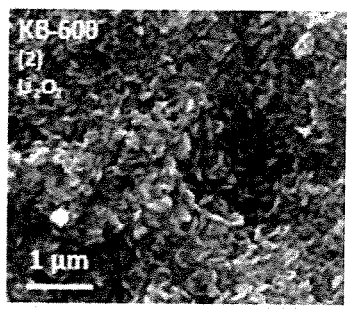
FIG. 12B shows an SEM image of a KB-600 cathode.
Figure 12C:
FIG. 12C KB-600 cathode coupled with Mn-MOF-74@CNT-coated GF/D separator.
Figure 12D:
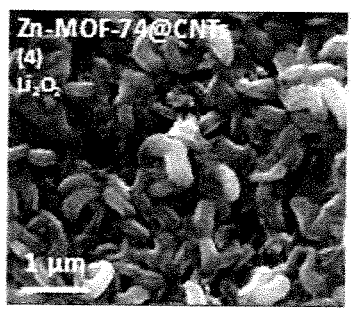
FIG. 12D Zn-MOF-74@CNTs cathode in humid oxygen (200 ppm moisture) at 125 mA g$^{-1}$.
Figure 12E:
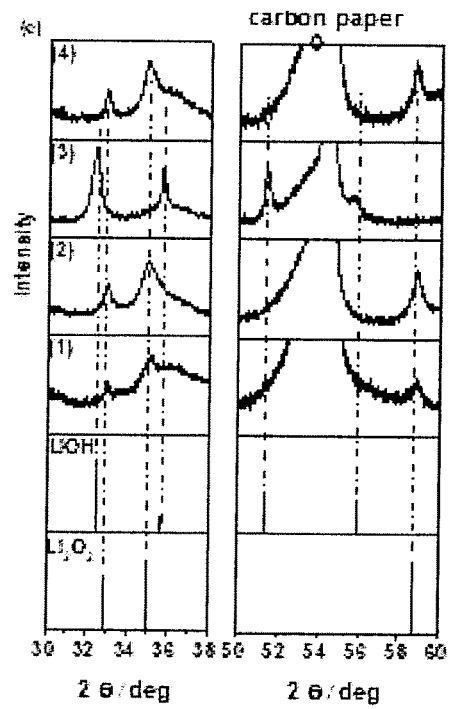
FIG. 12E shows XRD patterns of full discharged (1) CNTs, (2) KB-600 cathode, (3) KB-600 cathode coupled with Mn-MOF-74@CNT-coated GF/D separator, and (4) Zn-MOF-74@CNTs cathode in humid oxygen (200 ppm moisture) at 125 mA g$^{-1}$.

FIG. 12A-D show SEM images and FIG. 12E shows XRD patterns of full discharged (1) CNTs, (2) KB-600 cathode, (3) KB-600 cathode coupled with Mn-MOF-74@CNT-coated GF/D separator, and (4) Zn-MOF-74@CNTs cathode in humid oxygen (e.g., 200 ppm moisture) at 125 mA $g^{-1}$. Several control cathode materials in humid oxygen with 200 ppm moisture were studied to understand the formation mechanism of LiOH. As shown in FIGS. 12A-D, the discharge product of CNTs and KB-600 cathodes is toroid-like $Li_2O_2$ observed by SEM (FIGS. 12A-B) and PXRD (FIG. 12E). Interestingly, the KB-600 cathode coupled with Mn-MOF-74@CNTs-coated GF/D separator, however, shows a discharge product of LiOH nanoflakes (FIGS. 12c and E). It should be noted that the MOF-coated GF/D separator was intentionally isolated from the KB-600 cathode by putting another Celgard membrane between the MOF-coated GF/D separator and the KB-600 cathode (see FIG. 7). This observation clearly demonstrates that the formation of LiOH is based on a chemical catalysis by Mn-MOF-74@CNTs, rather than by an electrochemical reaction.

It was found that Zn-MOF-74@CNTs hybrid with coordinatively-unsaturated but non-redox-active $Zn^{2+}$ metal sites still showed the toroid-like $Li_2O_2$ instead of LiOH as its discharge product (FIGS. 12D and E), identical to that of CNTs and KB-600 cathodes. The only difference between Zn-MOF-74 hybrid and Mn-MOF-74@CNTs hybrid is the type of metal centers (non-redox-active or redox-active), obviously revealing that the active sites for the catalytic formation of LiOH are redox-active $Mn^{2+}/Mn^{3+}$ metal centers. Therefore, the redox-active MOFs with open metal centers will be good candidates for electrocatalysts in Li—$O_2$ batteries to be operated in humid oxygen.

It has been hypothesized that the formation of LiOH may relates to the catalytic decomposition of $H_2O_2$(Nat. Commun. 2015, 6, 7843). The catalytic activity of Mn-MOF-74@CNT and Zn-MOF-74@CNT hybrids was compared towards the decomposition of $H_2O_2$. While not illustrated, 11 mL of $O_2$ was generated from $H_2O_2$ decomposition catalyzed by Mn-MOF-74@CNTs after 1 min of reaction, whereas no bubbles were observed in the mixture of Zn-MOF-74@CNTs and $H_2O_2$ solution, clearly revealing that the Mn-MOF-74@CNT hybrid is a good catalyst for $H_2O_2$ decomposition, compared to the Zn-MOF-74@CNT hybrid. Besides, the catalytic activity of Me-MOF-74 towards $H_2O_2$ decomposition is summarized in Table 3. TABLE 3. Catalytic activity of Me-MOF-74 towards $H_2O_2$ decomposition.

TABLE 3

| Catalytic activity of Me-MOF-74 towards $H_2O_2$ decomposition. | |
| --- | --- |
| MOF Samples | Catalytic Activity |
| Mn-MOF-74 | Yes |
| Co-MOF-74 | Yes |
| Fe-MOF-74 | Yes |
| Ni-MOF-74 | No |
| Zn-MOF-74 | No |

Figure 13:
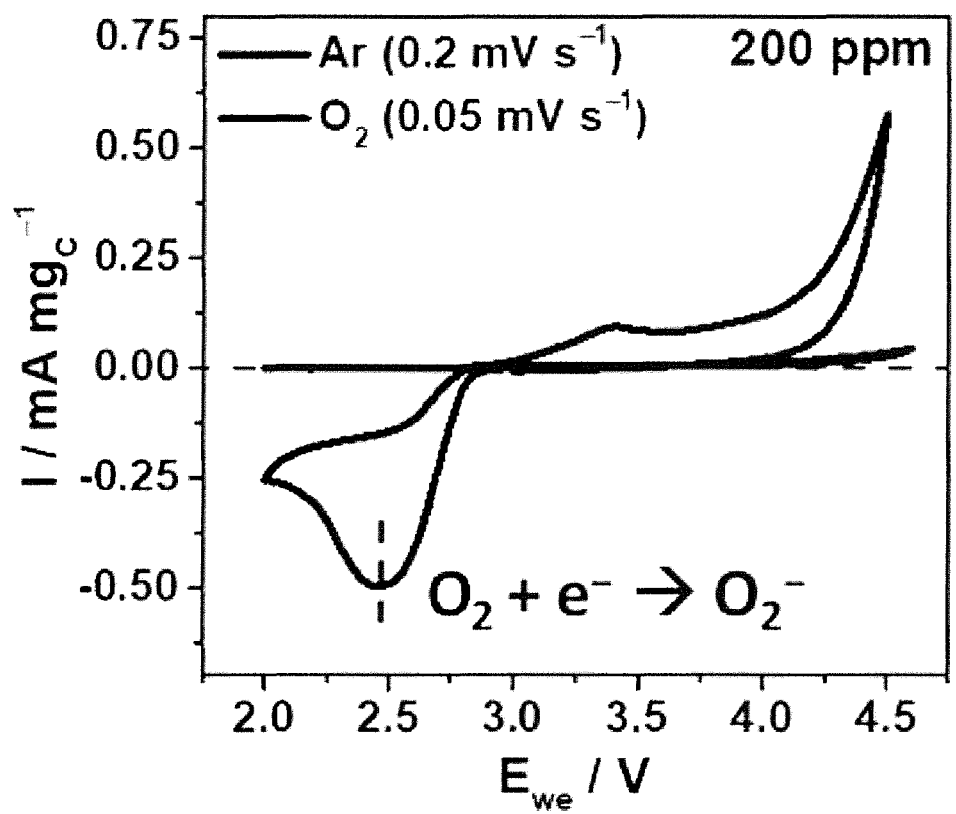
FIG. 13 shows CV curves of Mn-MOF-74@CNTs cathode in humid oxygen (200 ppm moisture) at 0.05 mV s$^{-1}$ and in Ar at 0.2 mV s$^{-1}$.

It was found that Fe- and Co-MOF-74 also showed the catalytic activity in addition to Mn-MOF-74. The reaction mechanism of the Mn-MOF-74@CNTs cathode in humid oxygen was further investigated using cyclic voltammetry (CV). FIG. 13 shows CV curves of Mn-MOF-74@CNTs cathode in humid oxygen e.g., (200 ppm moisture) at 0.05 mV $s^{-1}$ and in Ar at 0.2 mV $s^{-1}$. The CV result of FIG. 13 shows a single reduction peak located at ~2.5 V at a scan rate of 0.05 mV $s^{-1}$, corresponding to the reduction of $O_2$ to soluble $O_2^-$, which supports the solution growth mechanism in humid oxygen to form large flake-like crystals (see FIGS. 9D-F).

Figure 14:
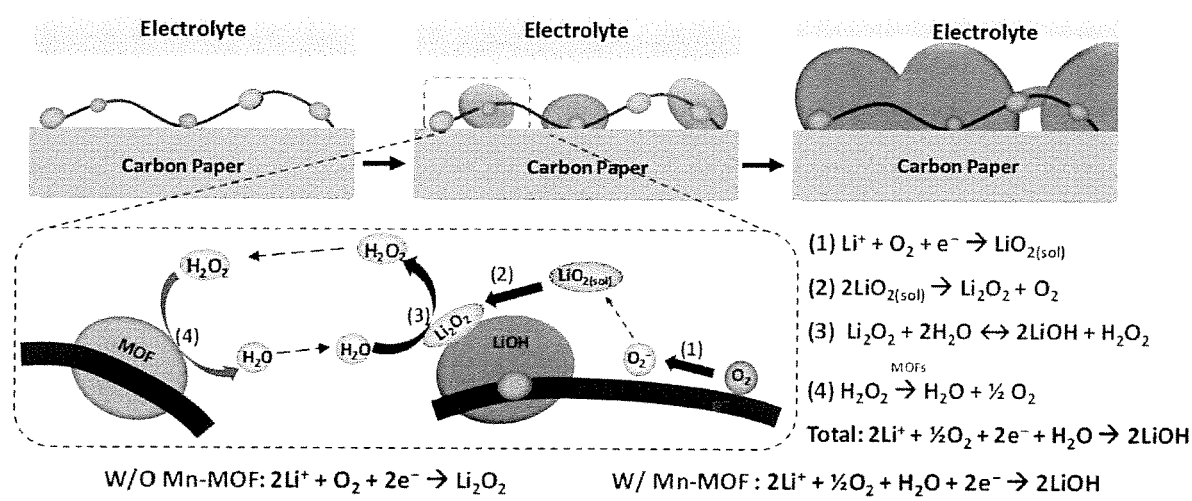
FIG. 14 illustrates the formation mechanism of flake-like LiOH discharge products in humid oxygen (200 ppm moisture) at a moderate current rate.

Based on the above results and analysis (see FIGS. 9-13), the formation mechanism of large disk-shaped aggregates of LiOH nanoflakes in humid oxygen with Mn-MOF catalyst is proposed and illustrated in FIG. 14. FIG. 14 in particular illustrates the formation mechanism of flake-like LiOH discharge products in humid oxygen (e.g., 200 ppm moisture) at a moderate current rate.

The related reactions are listed as follows:

$$2Li^+ + 2O_2 + 2e^- \rightarrow 2LiO_{2(sol)}; \tag{1}$$

$$2LiO_{2(sol)} \rightarrow Li_2O_2 + O_2; \tag{2}$$

$$Li_2O_2 + 2H_2O \leftrightarrow 2LiOH + H_2O_2; \tag{3}$$

$$H_2O_2 \rightarrow H_2O + \tfrac{1}{2}O_2; \tag{4}$$

$$\text{Reaction (3)+(4): } Li_2O_2 + H_2O \rightarrow 2LiOH + \tfrac{1}{2}O_2; \tag{5}$$

$$\text{Total: } 2Li^+ + \tfrac{1}{2}O_2 + H_2O + 2e^- \rightarrow 2LiOH. \tag{6}$$

The first two steps (i.e., Reaction 1 and 2) are similar to the solution growth mechanism proposed by other groups with carbon cathodes only. Importantly, Reaction 3 has a positive standard free-energy change (+41.7 kJ mol$^{-1}$) calculated using standard Gibbs free energies of formation, indicating this equilibrium position is far to the left and toroidal Li$_2$O$_2$ is the dominant discharge product as observed in KB-600, CNT, and Zn-MOF-74@CNT cathodes. In the presence of Mn-MOF-74 catalyst, however, Reaction 4 (the decomposition of H$_2$O$_2$) is remarkably facilitated and shifts the equilibrium position of Reaction 3 far to the right, as confirmed by the negative standard free-energy change of Reaction 5 (−75.0 kJ mol$^{-1}$) calculated using standard Gibbs free energy of formation. Finally, LiOH nanoflakes are generated as the final discharge product.

Figure 15A:
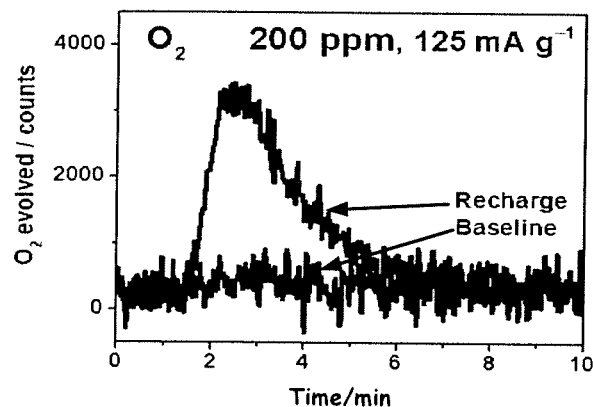
FIG. 15A shows Mass spectra.
Figure 15B:
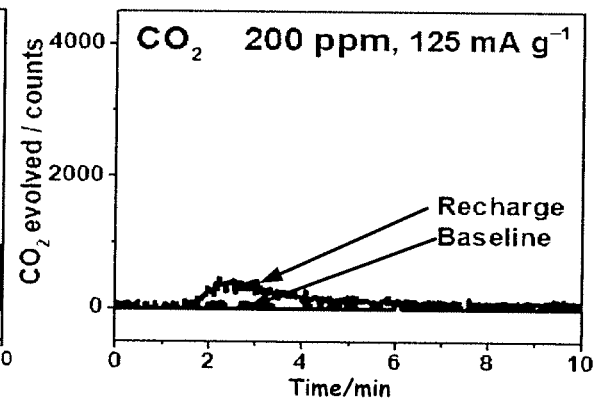
FIG. 15B also shows Mass spectra.
Figure 15C:
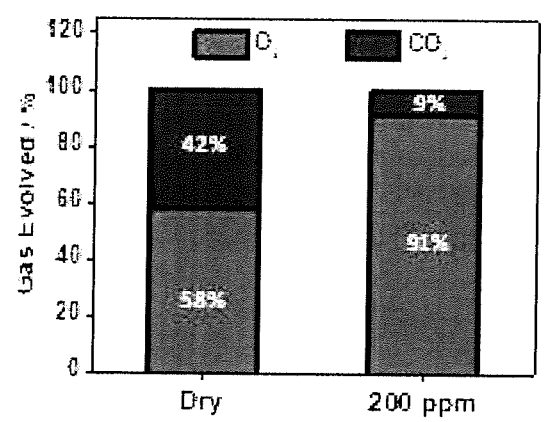
FIG. 15C shows the composition of gases evolved after recharging Mn-MOF-74@CNTs cells in argon for 12 h at 125 mA g$^{-1}$. Note that the cell was first pre-discharged in humid oxygen (200 ppm moisture).

The evolved gases during the recharge process was analyzed using mass spectrometry (MS) to further study the reversibility of LiOH. The MS results for O$_2$ and CO$_2$ signals as shown in FIG. 15A and FIG. 15B clearly show that the main component of the evolved gases was O$_2$ (91%) for the cell tested in humid O$_2$, in good agreement with previous study, further confirming the rechargeability of LiOH as revealed by PXRD (see FIG. 10A). A small amount of CO$_2$ was still present (9%), possibly caused by the degradation of carbon and/or the electrolyte at high charging potential. However, the percentage of O$_2$ in the evolved gases for the cell tested in dry O$_2$ is only 58% (FIG. 15C) where Li$_2$O$_2$ was the discharge product, indicative of much lower reactivity of LiOH compared to Li$_2$O$_2$. Therefore, it can be expected that Li—O$_2$ battery with less-reactive LiOH as discharge product will exhibit better cycling performance than that with Li$_2$O$_2$, owing to the less degradation of carbon electrodes and electrolytes.

Figure 16A:
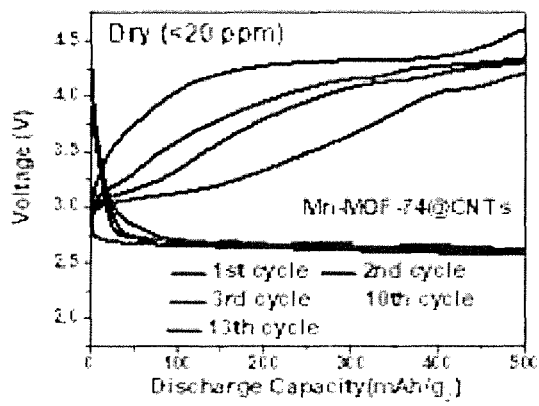
FIG. 16A shows discharge/charge profiles of Mn-MOF-74@CNTs in dry oxygen.
Figure 16B:
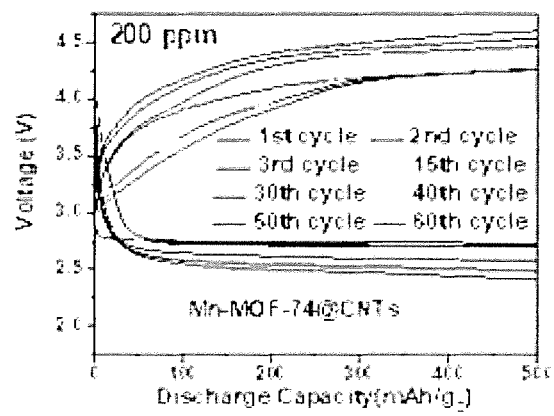
FIG. 16B shows discharge/charge profiles of Mn-MOF-74@CNTs in 200-ppm humid oxygen during cycling.
Figure 16C:
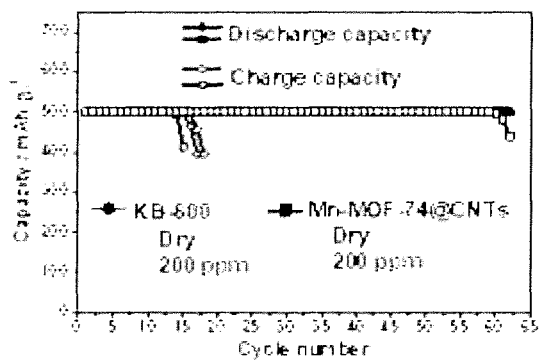
FIG. 16C shows discharge/charge profiles of Mn-MOF-74@CNTs in cycling performance of KB-600 and Mn-MOF-74@CNTs in oxygen with different moisture levels at 125 mA g$^{-1}$.
Figure 16D:
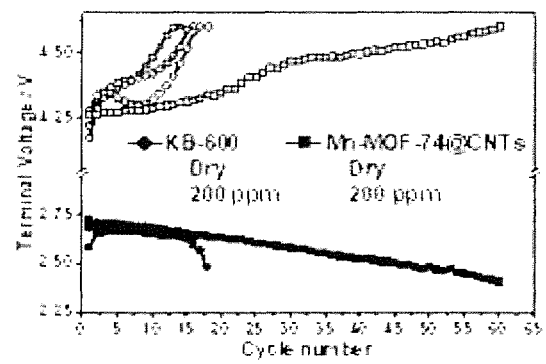
FIG. 16D also shows discharge/charge profiles of Mn-MOF-74@CNTs in cycling performance of KB-600 and Mn-MOF-74@CNTs in oxygen with different moisture levels at 125 mA g$^{-1}$.

Cycling tests at the limited capacity of 500 mA h g$^{-1}$ as well as a current density of 125 mA g$^{-1}$ were performed to evaluate the cycling performance of Li—O$_2$ batteries. The Mn-MOF-74@CNT cathode in humid oxygen containing ≥200 ppm moisture showed a higher charge potential than that in dry oxygen (see FIG. 16A and FIG. 16B), most likely due to the formation of large LiOH crystals with poor conductivity. However, the Mn-MOF-74@CNT cathode in humid oxygen exhibited a much improved cycle life (up to 60 cycles) than that in dry oxygen (14 cycles) and those of conventional carbon-based (CNTs and KB-600) cathodes in both dry and humid oxygen (<20 cycles), as shown in FIG. 16C and FIG. 16D.

Figure 17A:
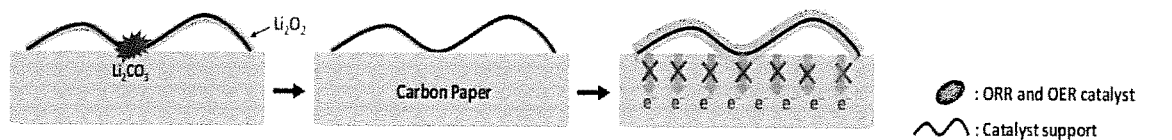
FIG. 17A shows a schematic illustration of the passivation process of all cathodes in dry oxygen.
Figure 17B:
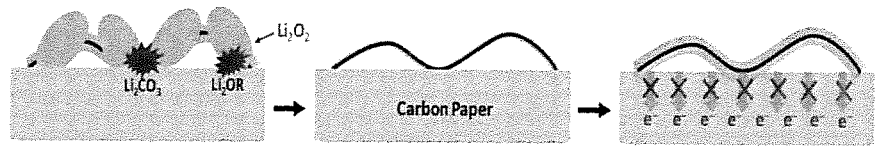
FIG. 17B shows a schematic illustration of the passivation process of a carbon (KB-600 or CNTs) only cathode.
Figure 17C:
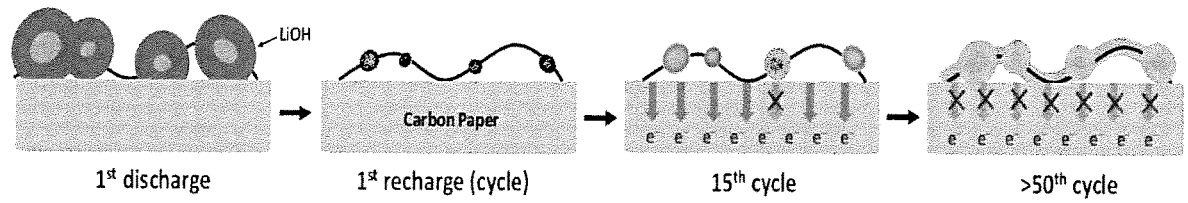
FIG. 17C shows a schematic illustration of the passivation process of a Mn-MOF-74@CNT cathode in humid oxygen, cycled at 500 mAh g$^{-1}$.

Based on the above analysis, a mechanism for the improved cycling performance of Mn-MOF@CNTs cathode is proposed and illustrated schematically in FIG. 17A-C. In dry oxygen with KB or CNTs only cathodes (see FIG. 17A), a highly-reactive Li$_2$O$_2$ coating deposits uniformly on the carbon cathode surface. Upon recharging, the aggressive Li$_2$O$_2$ readily reacts with carbon cathodes or electrolytes to form film-like side products that fully cover the surface of the oxygen cathode rapidly. Because these side products are not conductive, even a few nanometers of buildup will passivate the entire cathode in dry oxygen. In humid oxygen with KB or CNTs only cathodes (see FIG. 17B), the large toroids of highly-reactive Li$_2$O$_2$ are grown on defective sites of the carbon cathodes. Upon recharging, the side products also passivate the oxygen cathode quickly due to the high reactivity of Li$_2$O$_2$ with both the carbon cathodes and the electrolytes at high charge potential partially caused by the large crystals of insulating Li$_2$O$_2$. In humid oxygen with Mn-MOF-74@CNT hybrid cathode (see FIG. 17C), however, less-reactive LiOH is formed at the surface of MOF catalysts, which results in only trace amounts of side products are formed upon recharging. Moreover, those side products gradually accumulate only at the surface of MOF catalysts over cycles, rather than covering the entire cathode surface, leading to the slow passivation of the oxygen cathode. Therefore, it is the catalytic formation of less-reactive LiOH by the nano-architectured Mn-MOF-74@CNTs hybrid catalyst in humid oxygen environments that contribute together to the enhanced cycle life of Mn-MOF-74@CNTs hybrid cathode.

Figure 18A:
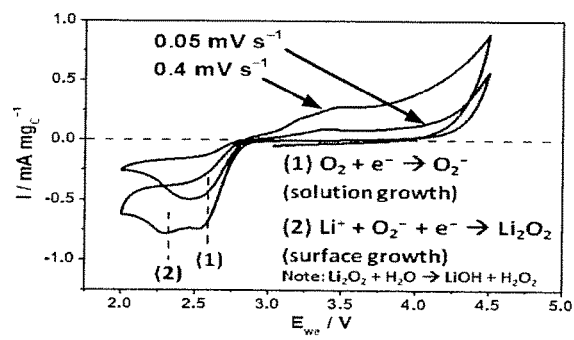
FIG. 18A shows CV curves of Mn-MOF-74@CNT cathode in humid oxygen (200 ppm moisture) at 0.4 mV s$^{-1}$ in comparison with at 0.05 mV s$^{-1}$.
Figure 18B:
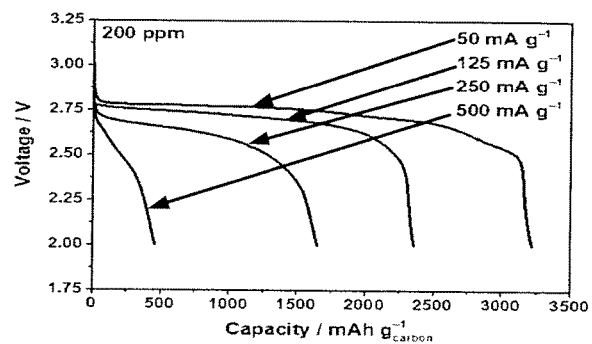
FIG. 18B shows discharge profiles of Mn-MOF-74@CNTs cathode in humid oxygen (200 ppm moisture) at 50, 125, 250, and 500 mA g$^{-1}$, respectively.
Figures 18C, 18D, 18E, 18F:
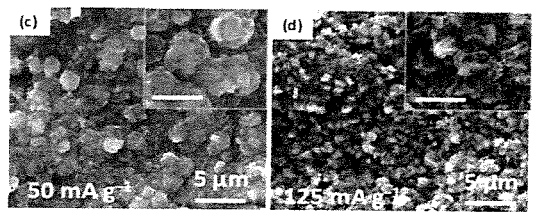
FIG. 18C show an SEM image of a discharged Mn-MOF-74@CNT cathode at a 50 mA g$^{-1}$ current densities (inset scale bar: 5 μm).
FIG. 18D show an SEM image of a discharged Mn-MOF-74@CNT cathode at a 125 mA g$^{-1}$ current densities (inset scale bar: 5 μm).
FIG. 18E show an SEM image of a discharged Mn-MOF-74@CNT cathode at a 250 mA g$^{-1}$ current densities (inset scale bar: 5 μm).

The effect of current rate on reaction pathway and discharge product in humid oxygen was investigated using CV and galvanostatic discharge-charge test. As shown in the CV curves (see FIG. 18A), another reduction peak at ~2.3 V appears when using a high scan rate at 0.4 mV s$^{-1}$, corresponding to the electrochemical reduction of O$_2^-$ to Li$_2$O$_2$. The explanation for this additional peak at a high scan rate is that the massive generation of O$_2^-$ in a brief period without enough time to diffuse away from the cathode surface leads to the accumulation of O$_2^-$ near the cathode surface. When the potential drops below 2.5 V, those accumulated O$_2^-$ intermediates undergo further electrochemical reduction to Li$_2$O$_2$. Note that this generated Li$_2$O$_2$ simultaneously reacts with water to form LiOH catalyzed by Mn-MOF-74@CNT as discussed for FIG. 14. In addition, the SEM images of full discharged cathodes show that large crystals of LiOH were formed based on solution-mediated growth at low current densities of 50 and 125 mA g$^{-1}$, whereas conformal coating of LiOH was deposited on the cathode surface based on surface-mediated growth at high current densities of 250 and 500 mA g$^{-1}$ (see FIGS. 18C-F). As a result, the discharge capacity of the cells decreases with the increase of current density (see FIG. 18B) while changing from toroid-like discharge to film discharge products.

Figure 19A:
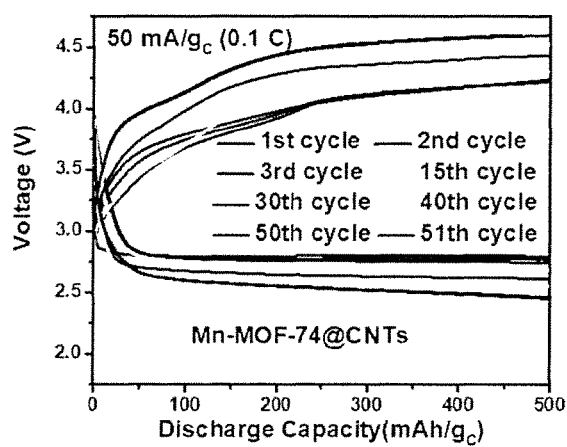
FIG. 19A shows voltage profiles of Mn-MOF-74@CNTs at 50 mA g$^{-1}$ in 200-ppm humid oxygen.
Figure 19B:
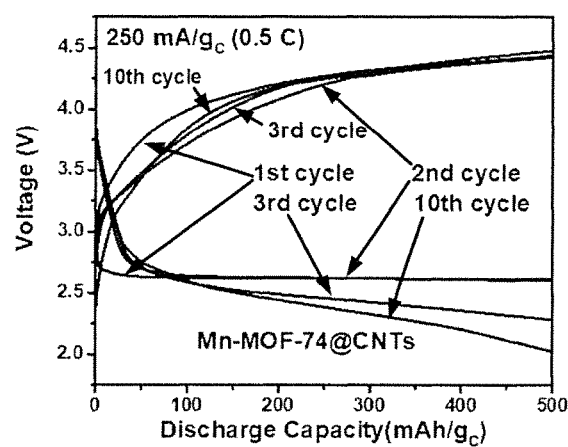
FIG. 19B shows voltage profiles of Mn-MOF-74@CNTs at 250 mA g$^{-1}$ with a limited capacity at 500 mAh g$^{-1}$ in 200-ppm humid oxygen.

The cycling performance of Mn-MOF-74@CNT cathodes at different current densities is shown in FIGS. 19A-B. When testing at 50 mA g$^{-1}$ (see FIG. 19A), Mn-MOF-74@CNTs showed a similar cycling performance (51 cycles) to that at 125 mA g$^{-1}$. In sharp contrast, a much poorer cycling performance (10 cycles) was observed at the high current density of 250 mA g$^{-1}$ (see FIG. 19B), which can be explained by aforementioned mechanism (see FIG. 17 and discussion). At high current density, conformal coating of LiOH was formed, resulting in the fast passivation of cathode surface by side products.

Figure 20A:
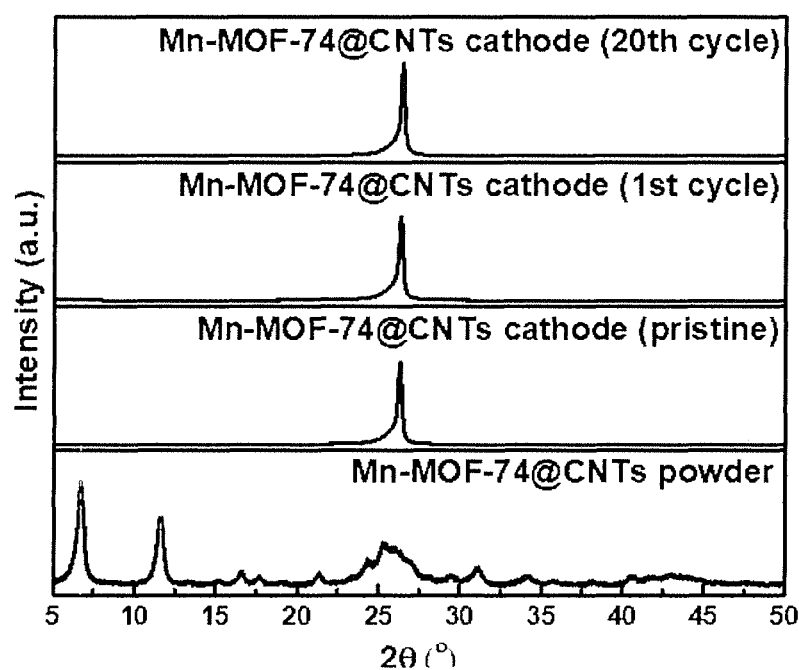
FIG. 20A shows XRD patterns of pure Mn-MOF-74@CNTs cathode in humid oxygen after different cycles.
Figure 20B:
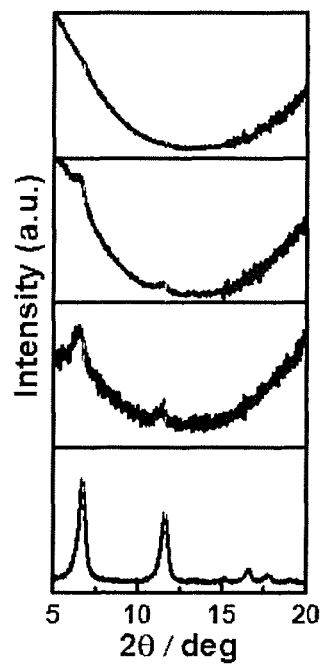
FIG. 20B shows enlarged parts of XRD patterns at the range of 5°-20°.

The cycled MOF cathodes were examined by powder PXRD to investigate stability of Mn-MOF-74@CNTs cathode. After initial recharge at 500 mAh g$^{-1}$, two main Mn-MOF-74 peaks were still noticeable. The PXRD patterns (see FIG. 20A and FIG. 20B) obviously indicate that Mn-MOF-74 nanoparticles maintained their crystal structure. However, Mn-MOF-74 peaks were negligible after 20 cycles, which could be ascribed to the accumulated passivation layer of side products. Therefore, the long-term stability of MOF-based oxygen cathodes should be carefully evaluated prior to practical applications.

It is to be understood that features described with regard to the various embodiments herein may be mixed and matched in any combination without departing from the spirit and scope of the invention. Although different selected embodiments have been illustrated and described in detail, it is to be appreciated that they are exemplary, and that a variety of substitutions and alterations are possible without departing from the spirit and scope of the present invention.

The invention claimed is:

1. A method for forming a Metal-organic framework/carbon nanotubes (MOF@CNTs) hybrid cathode material for use as a cathode in a Li—O$_2$ ion battery, comprising: deprotonating an organic linker solution for a metal oxide framework (MOF); dropwise adding the organic linker solution into a mixture that includes carbon nanotubes (CNTs); and in situ growing a plurality of MOF nanoparticles (NPs) onto a functionalized carbon nanotubes (CNTs) substrate so as to form the MOF@CNTs hybrid cathode material.

2. The method of claim 1, wherein the MOF@CNTs comprises a plurality of Me-MOF nanoparticles wherein Me is a metal selected from Manganese (Mn), Cobalt (Co), Nickel (Ni) Iron (Fe), or Zinc (Zn).

3. The method of claim 2, wherein the ratio of the Metal-organic framework (MOF) to carbon nanotubes (CNT) so as to form the MOF@CNT hybrids are in at least one ration selected from 48.8%:51.2%, 38.0%:62.0%, 46.6%:53.4%, and 58.0%:42.0%.

4. The method of claim 1, wherein the method further comprises:
conformally coating Li$_2$O$_2$ on a surface of a metal-organic framework in dry oxygen.

5. The method of claim 1, wherein the MOF@CNTs hybrid cathode material is operated as a cathode in a greater than or equal to (≥) 100 ppm humid oxygen Li—O$_2$ ion battery environment.

6. The method of claim 5, further comprising: chemically catalyzing Li$_2$O$_2$ to LiOH as a final discharge product(s) via the aid of the humid oxygen Li—O$_2$ ion battery environment.

7. The method of claim 6, wherein the LiOH final discharge product(s) comprise the reactions:

$$2Li^+ + 2O_2 + 2e^- \rightarrow 2LiO_{2(sol)};$$

$$2LiO_{2(sol)} \rightarrow Li_2O_2 + O_2;$$

$$Li_2O_2 + 2H_2O \leftrightarrow 2LiOH + H_2O_2;$$

$$H_2O_2 \rightarrow H_2O + \tfrac{1}{2}O_2;$$

Reaction (3)+(4): $Li_2O_2 + H_2O \rightarrow 2LiOH + \tfrac{1}{2}O_2;$

Total: $2Li^+ + \tfrac{1}{2}O_2 + H_2O + 2e^- \rightarrow 2LiOH.$

8. The method of claim 1, wherein the MOF@CNTs hybrid cathode material is operated as a cathode in a Li—O$_2$ ion battery at a current density from 50 mA g$^{-1}$ up to 500 mA g$^{-1}$.

9. The method of claim 8, wherein the discharge capacity increases 1400 mAh g$^{-1}$ up to 2500 mAh g$^{-1}$.

10. The method of claim 1, wherein the Metal-organic framework (MOF) content in the cathode material for use as a cathode is up to 30 wt %.

* * * * *